(12) United States Patent
Iizuka

(10) Patent No.: US 10,704,614 B2
(45) Date of Patent: Jul. 7, 2020

(54) HYBRID VEHICLE DRIVE APPARATUS

(71) Applicant: Honda Motor Co., Ltd., Tokyo (JP)

(72) Inventor: Kohei Iizuka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 179 days.

(21) Appl. No.: 15/960,088

(22) Filed: Apr. 23, 2018

(65) Prior Publication Data

US 2018/0313409 A1    Nov. 1, 2018

(30) Foreign Application Priority Data

Apr. 27, 2017 (JP) ................................. 2017-088606

(51) Int. Cl.
*F16D 25/0638* (2006.01)
*B60K 6/387* (2007.10)
(Continued)

(52) U.S. Cl.
CPC .......... *F16D 25/0638* (2013.01); *B60K 6/387* (2013.01); *B60K 6/48* (2013.01);
(Continued)

(58) Field of Classification Search
CPC ......... B60K 6/00–547; F16D 13/52–54; F16D 25/06–063; F16D 25/0635–0638; F16D 25/10; F16D 21/08
See application file for complete search history.

(56) References Cited

U.S. PATENT DOCUMENTS

| 7,293,637 | B2 * | 11/2007 | Janson | B60K 6/48 180/65.25 |
| 7,485,061 | B2 * | 2/2009 | Reisch | B60K 6/387 475/5 |
| 2017/0261045 | A1 * | 9/2017 | Chamberlin | F16D 25/10 |

FOREIGN PATENT DOCUMENTS

| DE | 3912356 A1 * | 10/1990 | ............. B60K 6/105 |
| JP | 2002087080 A | 3/2002 | |

(Continued)

*Primary Examiner* — David R Morris
*Assistant Examiner* — James J Taylor, II
(74) *Attorney, Agent, or Firm* — Duft & Bornsen, PC

(57) ABSTRACT

A hybrid vehicle drive apparatus, including a prime-mover-output-shaft, a transmission-input-shaft and a motor-rotor provided therebetween, each rotatable around an axis-line, a first-clutch connecting/disconnecting the output-shaft and the motor, a second-clutch connecting/disconnecting the motor and the input-shaft, a case-member having a radially extending non-rotating-sidewall-member and a non-rotating-shaft-member extending around the axis-line, and a rotor-support-member having a rotating-shaft-member rotatably fitted on the non-rotating-shaft-member and a rotating-sidewall-member facing the non-rotating-sidewall-member and extending radially outward from the rotating-shaft-member, and cantilevering the rotor, wherein the first/second-clutch has first/second-plates alternately and rotatably arranged in the axial-direction, a clutch-hub supporting the first-plates movably in the axial-direction, and a clutch-drum supporting the second-plates movably in the axial-direction, the clutch-hub of the first-clutch is integrally rotatable with the output-shaft, the clutch-hub of the second-clutch is integrally rotatable with the input-shaft, and the clutch-drums of the first/second-clutches are a single-shared-clutch-drum and integrally rotatable with the rotor-support-member.

7 Claims, 4 Drawing Sheets

LEFT ← → RIGHT

(51) Int. Cl.
*B60K 6/48* (2007.10)
*F16D 25/10* (2006.01)
*F16D 21/06* (2006.01)
*F16D 21/08* (2006.01)

(52) U.S. Cl.
CPC ...... *F16D 25/10* (2013.01); *B60K 2006/4825* (2013.01); *B60Y 2304/072* (2013.01); *B60Y 2400/4244* (2013.01); *F16D 21/08* (2013.01); *F16D 2021/0661* (2013.01); *Y10S 903/914* (2013.01)

(56) References Cited

FOREIGN PATENT DOCUMENTS

| | | |
|---|---|---|
| JP | 2011037401 A | 2/2011 |
| JP | 2017065287 A | 4/2017 |

\* cited by examiner

HYBRID VEHICLE DRIVE APPARATUS

CROSS-REFERENCE TO RELATED APPLICATION

This application is based upon and claims the benefit of priority from Japanese Patent Application No. 2017-088606 filed on Apr. 27, 2017, the content of which is incorporated herein by reference.

BACKGROUND OF THE INVENTION

Field of the Invention

This invention relates to a drive apparatus for a hybrid vehicle which has an engine and an electric motor as a traveling driving source.

Description of the Related Art

As apparatuses of this type are known ones that comprise a first clutch for connecting and disconnecting an engine and an electric motor (motor-generator) and a second clutch for connecting and disconnecting the electric motor and a transmission. Such an apparatus is set out in Japanese Unexamined Patent Publication No. 2002-087080 (JP2002-087080A), for example. An apparatus set out in JP2002-087080A is equipped with a clutch casing comprising a front wall and a rear wall that extend radially, this clutch casing is rotatably supported by a housing shaft member, and a first clutch and a second clutch are arranged axially in tandem in an inner space of the clutch housing between the front wall and the rear wall.

In the apparatus of JP2002-087080A, the motor rotor is straddle mounted between the front and rear walls of the clutch casing. Therefore, in order to install the pair of clutches between the front wall and rear wall of the clutch housing, the clutch housing has to be composed of multiple axially disassemblable components. However, when the clutch casing is composed of multiple axially disassemblable components, concentricity error arising between the front wall side and rear wall side of the clutch housing is apt to degrade axial accuracy of the rotor and lower motor output torque.

SUMMARY OF THE INVENTION

An aspect of the present invention is a hybrid vehicle drive apparatus, including: a prime mover having an output shaft rotatable around an axis line; a transmission having an input shaft rotatable around the axis line; an electric motor having a rotor of substantially cylindrical shape provided between the prime mover and the transmission to be rotatable around the axis line, and a stator arranged around the rotor; a first clutch of multi-plate wet type configured to connect and disconnect a first power transmission path between the output shaft of the prime mover and the electric motor; a second clutch of multi-plate wet type configured to connect and disconnect a second power transmission path between the electric motor and the input shaft of the transmission; a case member integrally having a non-rotating sidewall member radially extending to be unrotatable and a non-rotating shaft member of substantially cylindrical shape extending around the axis line supported by an inner radially end portion of the non-rotating sidewall; and a rotor support member integrally having a rotating shaft member of substantially cylindrical shape rotatably fitted on an outer peripheral surface of the non-rotating shaft member and a rotating sidewall member facing the non-rotating sidewall member and extending radially outward from the rotating shaft member, and cantilevering the rotor through the rotating shaft member and the rotating sidewall member, wherein the first clutch and the second clutch are arranged side by side in an axial direction of the axis line in a space sideward of the rotating sidewall member and radially inward of the rotor, and each of the first clutch and the second clutch has a plurality of first plates and a plurality of second plates alternately arranged in the axial direction to be rotatable relative to each other, a clutch hub supporting radially inner end portions of the plurality of first plates movably in the axial direction, and a clutch drum supporting radially outer end portions of the plurality of second plates movably in the axial direction, the clutch hub of the first clutch is provided integrally rotatable with the output shaft of the prime mover, the clutch hub of the second clutch is provided integrally rotatable with the input shaft of the transmission, and the clutch drum of the first clutch and the clutch drum of the second clutch are constituted by a single shared clutch drum, and the single shared clutch drum is integrally rotatable with the rotor support member.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
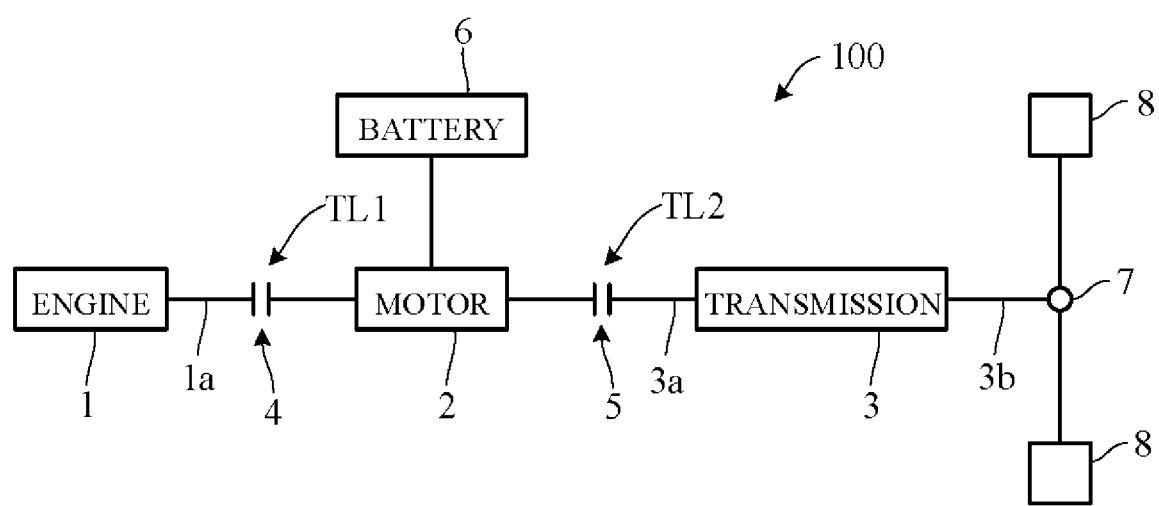
FIG. 1 is a diagram schematically showing overall configuration of a hybrid vehicle drive apparatus according to an embodiment of the present invention.

An embodiment of the present invention is explained in the following with reference to FIGS. 1 to 4B. An embodiment of the present invention is applied to a front-wheel-drive (FF layout) hybrid vehicle having an engine and an electric motor as propulsion power sources. However, the hybrid vehicle is not limited to the front-wheel-drive layout and can instead adopt some other type of drive system (e.g., a rear-wheel-drive layout). FIG. 1 schematically illustrates overall configuration of the hybrid vehicle drive system 100 according to an embodiment of the present invention.

As shown in FIG. 1, the drive apparatus 100 comprises an engine 1, a motor 2, a transmission 3, a disconnect clutch 4, a start clutch 5, and a battery 6.

The engine 1 is an internal combustion engine powered by explosively burning fuel, and can be a gasoline, diesel or other type internal combustion engine. An output shaft 1*a* is constituted by a crankshaft or by a rotating shaft connected to a crankshaft. The disconnect clutch 4 is installed in a first power transmission path TL1 between the engine 1 and motor 2. The disconnect clutch 4 makes and breaks the first power transmission path TL1, whereby motive power is or is not transmitted between the engine 1 and the motor 2.

The motor 2, which is electrically connected to the battery 6, functions as a motor driven by power supplied from the battery 6 and, during braking, functions as a generator that generates power and stores generated power in the battery 6. In other words, the motor 2 operates as a motor-generator. Charge/discharge of the battery 6 is controlled by an unshown control unit. Alternatively, a capacitor or other power storage device can be used instead of the battery 6. The start clutch 5 is installed in a second power transmission path TL2 between the motor 2 and the transmission 3. The start clutch 5 makes and breaks the second power transmission path TL2, whereby motive power is or is not transmitted between the motor 2 and the transmission 3.

The transmission 3 includes hydraulic components driven by hydraulic force and is configured to respond to hydraulic driving of the components by transmitting speed-adjusted rotation of an input shaft 3a to an output shaft 3b and by converting and transmitting to the output shaft 3b torque input to the input shaft 3a. Since the transmission 3 can be used a stepped transmission that manually or automatically shifts among multiple speed stages differing in speed ratio or a continuously variable transmission capable of varying speed ratio steplessly. Torque transmitted to the output shaft 3b is transmitted through a differential mechanism 7 to left and right drive wheels (front wheels) 8, thereby propelling the vehicle.

Typical operating modes of the hybrid vehicle incorporating the aforesaid drive apparatus 100 will be explained. Operating mode changes in response to engagement (ON) and disengagement (OFF) of the disconnect clutch 4 and the start clutch 5. When the clutches 4 and 5 are engaged and disengaged, the power transmission paths TL1 and TL2 are connected and disconnected.

In stopped condition of the vehicle, with the disconnect clutch 4 turned OFF and the start clutch 5 turned ON, when the motor 2 is driven by power supplied from the battery 6, motive power of the motor 2 is transmitted through the start clutch 5 to the transmission 3. Since this drives the wheels 8, the vehicle begins to run (motor-driven start-off). Thereafter, once rotational speed of the motor 2 has risen, the disconnect clutch 4 is gradually turned ON, so that power of the motor 2 starts the engine 1 by rotating its crankshaft.

When driving force of the engine 1 increases from this state, power of the engine 1 is transmitted through the disconnect clutch 4 and the start clutch 5 to the transmission 3. Power of the engine 1 and power of the motor 2 are therefore transmitted to the wheels 8, whereby the vehicle accelerates (assisted driving). When the disconnect clutch 4 is turned OFF while the vehicle is running at a predefined speed, the vehicle thereafter runs solely under power of the motor 2 (EV driving). During vehicle deceleration, the motor 2 is rotated by torque of the transmission 3 received through the start clutch 5. As a result, the motor 2 generates electric power and charges the battery 6 (regeneration).

In stopped condition of the vehicle, when the disconnect clutch 4 is turned ON and the start clutch 5 is turned OFF, the motor 2 is driven by motive power of the engine 1 transmitted through the disconnect clutch 4. The motor 2 therefore generates electric power and charges the battery 6 (stopped-vehicle charging). When the start clutch 5 is gradually turned on while continuing to charge the battery 6, power of the engine 1 is transmitted through the disconnect clutch 4 and the start clutch 5 to the transmission 3. Since this drives the wheels 8, the vehicle begins to run (engine-driven start-off).

In this state, when electric power is supplied to the motor 2 from the battery 6, while motive power of the engine 1 increases, power of the engine 1 is transmitted through the disconnect clutch 4 and the start clutch 5 to the transmission 3. Power of the engine 1 and power of the motor 2 are therefore transmitted to the wheels 8, whereby the vehicle accelerates (assisted driving). When supply of power from the battery 6 to the motor 2 is stopped, the vehicle thereafter runs solely under power of the engine 1 (engine driving). When the motor 2 is driven by motive power of the engine 1 at this time, the battery 6 can be charged during engine driving (driving-vehicle charging).

Essential components of the hybrid vehicle drive apparatus 100 according to the embodiment of the present invention are explained in the following. In the hybrid vehicle drive apparatus 100 according the present embodiment of the invention, the support structure of the motor 2 (rotor) and the arrangement of the motor 2 and clutches 4 and 5 are uniquely configured.

Specifically, in the present embodiment, the motor 2 and the pair of clutches 4 and 5 are provided between the engine 1 and the transmission 3 in the front-wheel drive hybrid vehicle. The motor 2 and the pair of clutches 4 and 5 must therefore be efficiently and compactly installed in a limited space between the engine 1 and the transmission 3. Moreover, in order to ensure adequate output of the motor 2 both as a motor and as a generator, the rotor of the motor 2 needs to be supported with enhanced axial accuracy.

Figure 2:
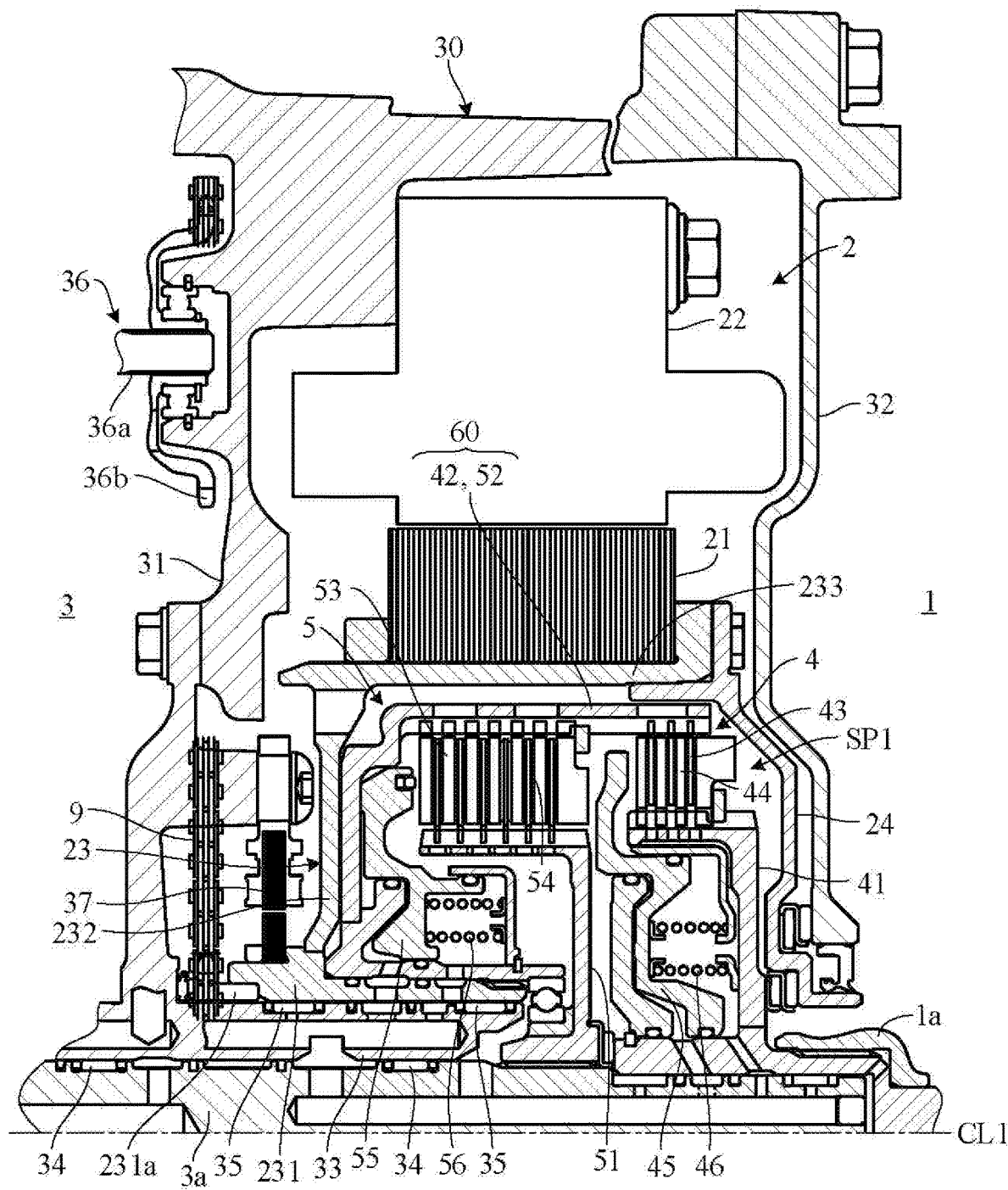
FIG. 2 is a sectional view showing essential components of the hybrid vehicle drive apparatus according to the embodiment of the present invention.

FIG. 2 is a sectional view showing essential components of the hybrid vehicle drive apparatus 100 according to the embodiment of the present invention. For convenience of explanation, CL1 in the drawing is defined to be a lateral axis, and relation among structural components is explained using this definition. Lateral direction corresponds to vehicle longitudinal direction or width direction, for example. Axis CL1 is coincident with center of rotation of the output shaft 1a of the engine 1 (FIG. 1), the motor 2 and the input shaft 3a of the transmission 3. The motor 2 is oriented coaxially with the output shaft 1a and the input shaft 3a. Direction parallel to axis CL1 (lateral direction) is called axial direction and direction orthogonal to axis CL1 is called radial direction.

As shown in FIG. 2, mainly the motor 2, the disconnect clutch 4 and the start clutch 5 are installed between radially extending left and right sidewalls (left sidewall 31 and right sidewall 32). The sidewalls 31 and 32 constitute part of a transmission case and other case members 30 rigidly mounted in and engine room. The transmission 3 is installed on the left side of the left sidewall 31, and the engine 1 is installed on the right side of the right sidewall 32. Optionally, a damper for absorbing rotational fluctuation of the engine 1 can be provided between the right sidewall 32 and the engine 1. The sidewalls 31 and 32 define an opening centered on axis CL1.

A substantially cylindrical shaft member 33 centered on axis CL1 is provided to extend rightward and leftward at a radially inner end portion of the left sidewall 31. An input shaft 3a is rotatably supported inside (in opening of) the shaft member 33 by multiple axially spaced bearings 34. The bearings 34 are constituted as needle bearings, for example. The input shaft 3a projects and extends rightward from the right end face of the shaft member 33 and penetrates an inner side (opening) of the right sidewall 32.

The motor 2 comprises a substantially cylindrical rotor 21 centered on axis CL1 and a substantially cylindrical stator 22 installed centered on axis CL1 to surround the rotor 21 at a specified clearance from an outer peripheral surface of the rotor 21. The stator 22 is fastened to the left sidewall 31 by through bolts. The rotor 21 is rotatably supported by a rotor support member 23.

The rotor support member 23 comprises an axis CL-centered substantially cylindrical shaft member 231 rotatably fitted on an outer peripheral surface of the shaft member 33 through multiple axially spaced bearings 35, a sidewall member 232 extending radially outward from the shaft member 231 leftward of a left end face of the rotor 21 so as to face the left sidewall 31, and an axis CL-centered substantially cylindrical retaining member 233 extending rightward from a radially outer end portion of the sidewall member 232. The bearings 35 are constituted as needle bearings, for example. An inner peripheral surface of the rotor 21 is fitted on the outer peripheral surface of the retaining member 233, and the rotor 21 is fixed on the retaining member 233. As a result, the rotor 21 is cantilevered from the shaft member 33 through the rotor support member 23.

A resolver 37 is attached to the left sidewall 31 so as to face the shaft member 231 of the rotor support member 23. Since the shaft member 231 rotates integrally with the rotor 21 of the motor 2, the resolver 37 can detect rotation angle of the rotor 21. In addition, a hydraulic pump 36 (only partially visible) is attached to the left sidewall 31. When its rotating shaft 36a is rotated, the hydraulic pump 36 supplies hydraulic oil to, inter alia, various hydraulic components in the transmission 3 and the clutches 4 and 5, and also supplies lubricating oil to points requiring lubrication. The hydraulic pump 36 has a gear unit 36b that rotates integrally with the rotating shaft 36a.

The left end portion of the shaft member 231 of the rotor support member 23 is, at the same axial position as the gear unit 36b, provided throughout its circumference with a gear unit 231a. An endless belt-like chain 9 is wound around the gear unit 36b and gear unit 231a, thereby arranging the chain 9 between the rotor support member 23 and the left sidewall 31. Rotation of the motor 2 is therefore transmitted through the chain 9 to the hydraulic pump 36, whereby the hydraulic pump 36 can be driven irrespective of engine 1 starting and/or the clutch 4 and 5 operation.

The start clutch 5 and the disconnect clutch 4 are arranged laterally in tandem on the right side of the sidewall member 232, within a space SP1 radially inward of the retaining member 233. The clutches 4 and 5 are configured as multi-plate wet clutches. A cover 24 fastened to a right end portion of the retaining member 233 prevents oil from passing on a right side of the rotor 21, i.e., prevents oil outflow from the space SP1 to a radially outward space in which the motor 2 is installed. Although not illustrated, an oil seal is provided between a left end portion of the retaining member 233 of the rotor support member 23 and the left sidewall 31. This oil seal prevents oil from passing on a left side of the rotor 21, i.e., prevents oil outflow from the space SP1 to the radially outward space in which the motor 2 is installed.

The disconnect clutch 4 comprises a clutch hub 41, a clutch drum 42, outer plates 43, inner plates 44, a clutch piston 45, and a return spring 46. Similarly, the start clutch 5 comprises a clutch hub 51, a clutch drum 52, outer plates 53, inner plates 54, a clutch piston 55, and a return spring 56. The clutch drums 42 and 52 share a single common clutch drum hereinafter designated by symbol 60.

Figure 3:
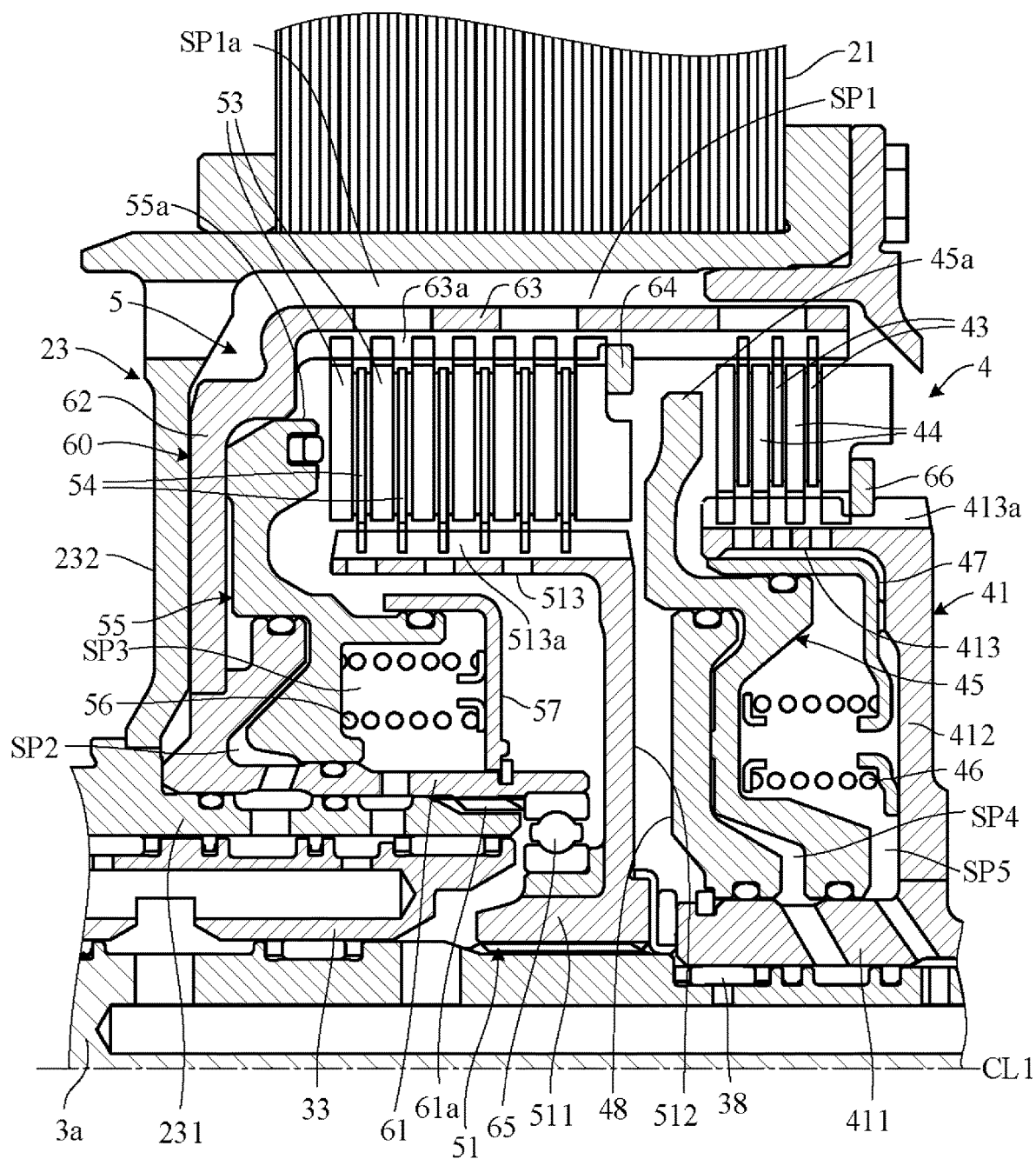
FIG. 3 is an enlarged view of an essential part of FIG. 2.

There now follows a detailed explanation of the structure of the clutches 4, 5. FIG. 3 is an enlarged view of an essential part of FIG. 2. As shown in FIG. 3, the clutch drum 60 comprises an axis CL1-centered substantially cylindrical shaft member 61 fitted on an outer peripheral surface of the shaft member 231 of the rotor support member 23, a sidewall member 62 extending radially outward from a left end portion of the shaft member 61, and an axis CL1-centered substantially cylindrical guide member 63 extending rightward from a radially outer end portion of the sidewall member 62.

The shaft member 61 is engaged with the shaft member 231 through a spline 61a formed on its inner peripheral surface, and the clutch drum 60 rotates integrally with the rotor support member 23. A left end portion of the shaft member 61 abuts on rotor support member 23, and a right end portion of the shaft member 61 projects rightward beyond a right end face of the shaft member 231. The sidewall member 62 is arranged slightly spaced from or in abutment with the sidewall member 232 of the rotor support member 23.

A spline 63a is formed on the inner peripheral surface of the guide member 63, and the multiple outer plates 43 of the disconnect clutch 4 and the multiple outer plates 53 of the start clutch 5 axially movably engage the spline 63a. Moreover, a stop 64 is fixed on the inner peripheral surface of the guide member 63 at a specified axial position, and the outer plates 53 and the outer plates 43 axially movably engage the stop 64 on its left side and right side, respectively.

The clutch hub 51 of the start clutch 5 comprises an axis CL1-centered substantially cylindrical shaft member 511, a sidewall 512 extending radially outward from a right end portion of the shaft member 511 and passing rightward of the shaft member 61 of the clutch drum 60, and an axis CL1-centered substantially cylindrical guide member 513 extending leftward from a radially outer end of the sidewall 512. An inner peripheral surface of the shaft member 511 is spline-coupled with an outer peripheral surface of the input shaft 3a, so that the clutch hub 51 rotates integrally with the input shaft 3a.

An outer peripheral surface of the guide member 513 of the clutch hub 51 faces the inner peripheral surface of the guide member 63 of the clutch drum 60. Splines 513a are formed on this outer surface, and the multiple inner plates 54 are axially (laterally) movably engaged with the splines 513a alternately with the outer plates 53. The outer plates 53 and inner plates 54 are collectively called a plate group. Movement of the plates 53 and 54 toward right is restricted by the stop 64. A ball bearing 65 is interposed between the shaft member 511 of the clutch hub 51 and the shaft member 61 of the clutch drum 60, and the clutch hub 51 is rotatable relative to the clutch drum 60.

The clutch piston 55 of the start clutch 5 is slidably fitted on an outer peripheral surface of the shaft member 61 of the clutch drum 60. A spring seat plate 57 is supported on the outer peripheral surface of the shaft member 61 at a specified position rightward of the clutch piston 55, and the return spring 56 is interposed between the clutch piston 55 and the spring seat plate 57. An abutment member 55a is provided on a radially outward right end portion of the clutch piston 55 so as to abut a left end face of the plate group 53-54 (more exactly, left end face of the leftmost outer plate 53). Oil chambers SP2 and SP3 are formed between the clutch piston 55 and the sidewall member 62 and between the clutch piston 55 and the spring seat plate 57, respectively.

In initial state prior to application of hydraulic pressure to the oil chamber SP2, the clutch piston 55 is pushed leftward by biasing force of the return spring 56, as illustrated, whereby the clutch piston 55 abuts the sidewall member 62 of the clutch drum 60. In this state, no contacting pressure acts between the outer plates 53 and the inner plates 54, so that the plates 53 and 54 are mutually rotatable. Since the start clutch 5 is therefore disengaged, transmission of motive power between the rotor 21 of the motor 2 and the input shaft 3a of the transmission 3 is cut off.

On the other hand, when hydraulic pressure supplied through oil supply passages provided in the input shaft 3a and shaft members 33, 231 and 61 is applied to the oil chamber SP2, the clutch piston 55 is pushed rightward overcoming the biasing force of the return spring 56. Since the outer plates 53 and inner plates 54 are therefore pushed rightward, contacting pressure acting mutually among the plates 53 and 54 engages the start clutch 5. As a result, transmission of motive power from the rotor 21 of the motor 2 through the start clutch 5 to the input shaft 3a is enabled. (Hydraulic pressure (very low hydraulic pressure) can be supplied to the oil chamber SP3 through the oil supply passages provided in the input shaft 3a and shaft members 33, 231 and 61.) Leftward pressing force acting on the clutch piston 55 is mostly biasing force of the return spring 56 and centrifugal hydraulic pressure produced by rotation of the clutch proper, and engaging force of the start clutch 5 can be adjusted by adjusting hydraulic force counter to this pressing force acting in the oil chamber SP2.

The clutch hub 41 of the disconnect clutch 4 comprises an axis CL1-centered substantially cylindrical shaft member 411, a sidewall 412 extending radially outward from an axially center portion of the shaft member 411, and an axis CL1-centered substantially cylindrical guide member 413 extending leftward from a radially outer end of the sidewall 412. The shaft member 411 is relatively rotatably fitted on the outer peripheral surface of the input shaft 3a through multiple axially spaced bearings 38. A right end portion of the shaft member 411 is spline-coupled to a left end portion of the output shaft 1a of the engine 1 (shown in FIG. 2), so that the clutch hub 41 rotates integrally with the output shaft 1a.

An outer peripheral surface of the guide member 413 of the clutch hub 41 faces the inner peripheral surface of the guide member 63 of the clutch drum 60. Splines 413a are formed on this outer surface, and the multiple inner plates 44 are axially (laterally) movably engaged with the splines 413a alternately with the outer plates 43. The outer plates 43 and inner plates 44 are collectively called a plate group. A stop 66 is fixed on the outer peripheral surface of the guide member 413, and movement of the plates 43 and 44 toward right is restricted by the stop 66.

The clutch piston 45 of the start clutch 4 is slidably fitted on an outer peripheral surface of the shaft member 411 of the clutch hub 41. A spring seat plate 47 is fitted radially inward of the guide member 413 of the clutch hub 41. A right end face of the spring seat plate 47 abuts a left end face of the sidewall 412 of the clutch hub 41, and the return spring 46 is interposed between the clutch piston 45 and the spring seat plate 47. A stop plate 48 for limiting leftward movement of the clutch piston 45 is fitted on the outer peripheral surface the shaft member 411 of the clutch hub 41. An abutment member 45a is provided on a radially outward right end portion of the clutch piston 45 so as to abut a left end face of the plate group 43-44 (more exactly, right end face of the leftmost outer plate 44). Oil chambers SP4 and SP5 are formed between the clutch piston 45 and the stop plate 48 and between the clutch piston 45, the clutch hub 41 and the spring seat plate 47, respectively.

In initial state prior to application of hydraulic pressure to the oil chamber SP4, the clutch piston 45 is pushed leftward by biasing force of the return spring 46, as illustrated, whereby the clutch piston 45 abuts the stop plate 48. In this state, no contacting pressure acts between the outer plates 43 and the inner plates 44, so that the plates 43 and 44 are mutually rotatable. Since the disconnect clutch 4 is therefore disengaged, transmission of motive power between the rotor 21 of the motor 2 and the output shaft 1a (FIG. 2) of the engine 1 is cut off.

On the other hand, when hydraulic pressure supplied through oil supply passages provided in the input shaft 3a and shaft member 411 is applied to the oil chamber SP4, the clutch piston 45 is pushed rightward overcoming the biasing force of the return spring 46. Since the outer plates 43 and inner plates 44 are therefore pushed rightward, contacting pressure acting mutually among the plates 43 and 44 engages the disconnect clutch 4. As a result, transmission of motive power from the rotor 21 of the motor 2 through the disconnect clutch 4 to the output shaft 1a is enabled. (Hydraulic pressure (very low hydraulic pressure) can be supplied to the oil chamber SP5 through the oil supply passages provided in the input shaft 3a and shaft member 411.) Leftward pressing force acting on the clutch piston 45 is mostly biasing force of the return spring 46 and centrifugal hydraulic pressure produced by rotation of the clutch proper, and engaging force of the disconnect clutch 4 can be adjusted by adjusting hydraulic force counter to this pressing force acting in the oil chamber SP4.

The clutches 4 and 5 are multi-plate wet clutches. Cooling lubricant is therefore supplied to the plates 43 and 44 of the clutch 4 and the plates 53 and 54 of the clutch 5 via through-holes formed in the guide members 413 and 513 of the clutch hubs 41 and 51, and in the guide member 63 of the clutch drum 60, and the supplied lubricant outflows from the space SP1 through a through-hole formed in the sidewall member 232 (more exactly, from a gap SP1a between an inner peripheral surface of the retaining member 233 and an outer peripheral surface of the guide member 63).

Figure 4A:
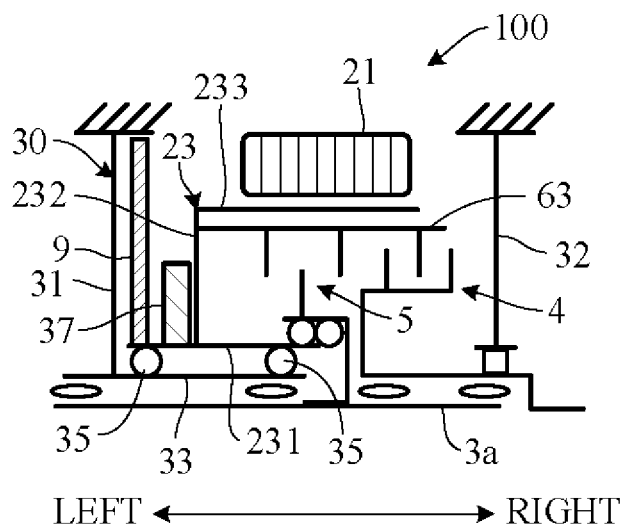
FIG. 4A is a skeleton diagram schematically showing essential components of the hybrid vehicle drive apparatus according to the embodiment of the present invention.
Figure 4B:
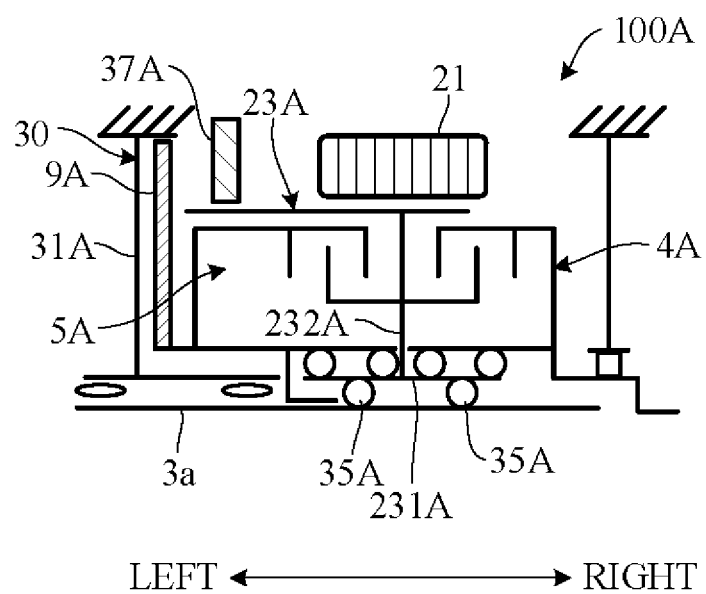
FIG. 4B is a diagram showing an example for comparison with that of FIG. 4A.

FIG. 4A is a skeleton diagram schematically illustrating essential components of the hybrid vehicle drive unit 100 according to this embodiment of the present invention, and FIG. 4B is a diagram showing configuration of a unit 100A as an example for comparison with that of FIG. 4A.

In the present embodiment, as shown in FIG. 4A, the shaft member 231 of the rotor support member 23 is rotatably supported by the shaft member 33 of a case member (the left sidewall 31) through bearings 35. The rotor 21 is cantilevered by the rotor support member 23 through the sidewall member 232 extending radially outward from a mid-shaft portion of the shaft member 231 and the retaining member 233 extending rightward from a distal end portion of the sidewall member 232. Since the rotor 21 is therefore cantilevered from one of the case members 30 integrally with the rotor support member 23 solely through the bearings 35, axial accuracy of the rotor 21 with respect to the case members 30 can be enhanced.

Moreover, in the present embodiment, the start clutch 5 and the disconnect clutch 4 are arranged laterally in tandem rightward of the sidewall member 232 of the rotor support member 23, and the guide member 63 of the clutch drum 60 is installed radially inward of the retaining member 233 of the rotor support member 23 so as to be unitarily rotatable with the rotor support member 23. Owing to the start clutch 5 and the disconnect clutch 4 being arranged laterally in tandem inward of the rotor 21 of the motor 2 in this manner, the clutches 4 and 5 can share a component (the guide member 63), whereby the drive unit 100 can be compactly configured.

In addition, in the present embodiment, the chain 9 is installed between the left sidewall 31 of the case members 30 and the rotor support member 23, and rotation of the shaft member 231 of the rotor support member 23 is transmitted through the chain 9 to the hydraulic pump 36 (FIG. 2). This enables the motor 2 to drive the hydraulic pump 36 irrespective of starting of the engine 1 or operation of the clutches 4 and 5. Still further, in the present embodiment, the resolver 37 is arranged so as to face the sidewall member 232 of the rotor support member 23, thereby minimizing radial direction size of the resolver 37.

In contrast, in the comparative example of the present embodiment shown in FIG. 4B, a sidewall member 232A of a rotor support member 23A is disposed at an axially middle portion of the rotor 21, and a shaft member 231A of the rotor support member 23A is rotatably supported by the input shaft 3a through bearings 35A. Axial accuracy of the rotor 21 is therefore degraded because play of the rotor support member 23A becomes large in comparison to that when the rotor 21 is supported by the case member 30 (FIG. 4A). Moreover, owing to the fact that in the configuration of FIG. 4B a start clutch 5A and a disconnect clutch 4A are arranged on opposite lateral (left-right) sides of the sidewall member 232A, overall size of the unit is enlarged due to axial length of the unit becoming longer than in the case of arranging the clutches adjacently (FIG. 4A).

Further, in the configuration of FIG. 4B, the start clutch 5A faces the left sidewall 31A of the case members 30, a chain 9A is wound around shaft members of the start clutch 5A, and rotation of the motor 2 is therefore transmitted through the start clutch 5A and the chain 9A to the hydraulic pump. Therefore, differently from in the configuration of FIG. 4A, the chain 9 (9A) cannot be driven by rotation of the rotor 21 in the initial disengaged state of the start clutch 5A. Since this makes separate means for driving the hydraulic pump necessary, it involves an increase in number of components. Furthermore, in the configuration of FIG. 4B, a resolver 37A is installed sideward of the rotor 21, so that the resolver 37A becomes large in diameter.

The present embodiment can achieve advantages and effects such as the following:

(1) The hybrid vehicle drive unit 100 comprises: the engine 1 having the output shaft 1a rotatable around the axis CL1; the transmission 3 having the input shaft 3a rotatable around the axis CL1; the motor 2 having the substantially cylindrical rotor 21 installed between the engine 1 and the transmission 3 to be rotatable around the axis CL1 and the stator 22 installed around the rotor 21; the multi-plate wet disconnect clutch 4 for connecting and disconnecting the first power transmission path TL1 between the output shaft 1a of the engine 1 and the motor 2; the multi-plate wet start clutch 5 for connecting and disconnecting the second power transmission path TL2 between the motor 2 and the input shaft 3a of the transmission 3; the case members 30 integrally including the radially extending non-rotating left sidewall 31 and the substantially cylindrical shaft member 33 supported by the inner radially end portion of the left sidewall 31 so as to extend centered on the axis CL1; and the rotor support member 23 integrally including the substantially cylindrical shaft member 231 rotatably fitted on the outer peripheral surface of the shaft member 33 and the sidewall member 232 facing the left sidewall 31 and extending radially outward from the shaft member 231 so as to cantilever the rotor 21 through the shaft member 231 and the sidewall member 232 (FIGS. 1 and 2). The disconnect clutch 4 and the start clutch 5 are arranged laterally in tandem in the space SP1 rightward of the sidewall member 232 and radially inward of the rotor 21 and respectively comprise the multiple inner plates 44, 54 and multiple outer plates 43, 53 alternately arranged axially to be rotatable relative to one another, the clutch hubs 41, 51 for axially movably supporting radially inner end portions of the inner plates 44, 54, and the clutch drum 60 (42, 52) for axially movably supporting radially outer end portions of the outer plates 43, 53 (FIGS. 2 and 3). The clutch hub 41 of the disconnect clutch 4 is provided so as to be unitarily rotatable with the output shaft 1a of the engine 1, and the clutch hub 51 of the start clutch 5 is provided so as to be unitarily rotatable with the input shaft 3a of the transmission 3 (FIGS. 2 and 3). The clutch drum 42 of the disconnect clutch 4 and the clutch drum 52 of the start clutch 5 are formed by the shared single clutch drum 60, and the clutch drum 60 is provided so as to be unitarily rotatable with the rotor support member 23 (FIGS. 2 and 3).

Owing to this configuration, the motor 2, the disconnect clutch 4 and the start clutch 5 can be efficiently and compactly installed in the limited space between the engine 1 and the transmission 3, and since axial accuracy of the rotor 21 is enhanced, the motor 2 can achieve ample output torque.

(2) The clutch drum 60 comprises the axis CL1-centered, substantially cylindrical shaft member 61 fitted on the outer peripheral surface of the shaft member 231 so as to be unitarily rotatable with the shaft member 231, the sidewall member 62 facing the sidewall member 232 and extending radially outward from one axial end portion of the shaft member 61, and the axis CL1-centered, substantially cylindrical guide member 63 extending rightward from the radially outer end portion of the sidewall member 62 (FIG. 3). The outer plates 43 of the disconnect clutch 4 and the outer plates 53 of the start clutch 5 are axially movably supported by the inner peripheral surface of the guide member 63 (FIG. 3). Since the clutch drum 60 is thus formed to have a substantially angular U-shaped cross-section, the rotor support member 23 can be partially formed to have the substantially angular U-shaped cross-section so that the clutch drum 60 can be installed efficiently along the rotor support member 23 and integrally therewith, and, in addition, structural components of the clutches 4, 5 (clutch hubs 41, 51, clutch pistons 45, 55, etc.) can be easily installed radially inward of the single clutch drum 60 and guide member 63.

(3) The hybrid vehicle drive unit 100 comprises the hydraulic pump 36 and the chain 9 for transmitting torque of the shaft member 231 of the rotor support member 23 to the rotating shaft 36a the hydraulic pump 36 (FIG. 2). Since the hydraulic pump 36 can therefore be driven by torque of the motor 2 even before operation (engagement) of the clutches 4 and 5, the clutches 4, 5 can be easily operated.

(4) The hybrid vehicle drive unit 100 further comprises the resolver 37 installed leftward of the sidewall member 232 for detecting rotation angle of the motor 2 (FIG. 2). Since the installation of the resolver 37 leftward of the sidewall member 232 in this manner minimizes resolver 37 diameter, the drive unit 100 can be compactly structured.

In the aforesaid embodiment, the sidewall member 232 of the rotor support member 23 that supports the rotor 21, and the sidewall member 62 of the clutch drum 60 extend radially on the left side (transmission 3 side) of the rotor 21, but alternatively these can be radially extended on the right side (engine 1 side) of the rotor 21 and the retaining member 233 and guide member 63 be extended leftward from radially outer end portions thereof. Specifically, it is possible to provide an axis CL1-centered, non-rotating substantially cylindrical shaft member on the inner radial end portion of the right sidewall 32 of the case members 30 and cantilever the rotor 21 from an outer peripheral surface of this shaft member through the rotor support member. In this case, by adopting a configuration having no axial through-hole formed in the sidewall member of the rotor support member, this sidewall member can also fill the role of the cover 24, so that the cover 24 can be omitted.

In the aforesaid embodiment, the case members 30 integrally include the radially extending non-rotating sidewall 31 (non-rotating sidewall member) and the substantially cylindrical shaft member 33 (non-rotating shaft member) supported by the inner radially end portion of the left sidewall 31 so as to extend centered on the axis CL1, but the case members are not limited to this configuration. As stated earlier, the non-rotating shaft member can be provided to extend from the right sidewall 32. In the aforesaid embodiment, the rotor support member 23 integrally comprises the substantially cylindrical shaft member 231 (rotatable shaft member) rotatably fitted on the outer peripheral surface of the shaft member 33, and the sidewall member 232 (rotating sidewall member) facing the left sidewall 31 and extending radially outward from the shaft member 231, and the rotor 21 is cantilevered through the shaft member 231 and the sidewall member 232, but the rotor support member is not limited to this configuration. As stated earlier, the rotating sidewall member can be provided facing the right sidewall 32.

In the aforesaid embodiment, the disconnect clutch 4 serving as the first clutch and the start clutch 5 serving as the second clutch are arranged axially in tandem in the space SP1 sideward of the sidewall member 232 and radially inward of the rotor 21 and respectively comprise the multiple inner plates 44, 54 (first plates) and multiple outer plates 43, 53 (second plates) alternately arranged axially to be rotatable relative to one another, but the first and second clutches can be of any configuration insofar as their clutch drums are formed by a shared single clutch drum and this clutch drum is provided so as to be unitarily rotatable with a rotor support member. For example, the sidewall 412, 512 of at least one clutch hubs 41, 51 can be provided to extend radially from the left end portion of the shaft member 411, 511. In the aforesaid embodiment, the single clutch drum 60 comprises the axis CL1-centered, substantially cylindrical shaft member 61 (second rotating shaft member) fitted on the outer peripheral surface of the shaft member 231 (first rotating shaft member) so as to be unitarily rotatable with the shaft member 231, the sidewall member 62 (second rotating sidewall member) facing the sidewall member 232 and extending radially outward from the shaft member 61, and the axis CL1-centered, substantially cylindrical guide member 63 extending axially from the radially outer end portion of the sidewall member 62, but the clutch drum is not limited to this configuration.

In the aforesaid embodiment, torque of the shaft member 231 of the rotor support member 23 is transmitted to the rotating shaft 36a of the hydraulic pump 36 through the chain 9, but the endless belt-like member can instead be formed as a belt instead of a chain. In the aforesaid embodiment, rotation angle of the motor 2 is detected by the resolver 37 installed sideward of the sidewall member 232 of the rotor support member 23, but the detector is not limited to this configuration.

The above embodiment can be combined as desired with one or more of the above modifications. The modifications can also be combined with one another.

According to the present invention, it is possible to install a motor and first and second clutches in a limited space between a prime mover and a transmission efficiently and compactly, and to enhance axial accuracy of a rotor, ensuring adequate output torque of the motor.

Above, while the present invention has been described with reference to the preferred embodiments thereof, it will be understood, by those skilled in the art, that various changes and modifications may be made thereto without departing from the scope of the appended claims.

What is claimed is:
1. A hybrid vehicle drive apparatus, comprising:
a prime mover having an output shaft rotatable around an axis line;
a transmission having an input shaft rotatable around the axis line;
an electric motor having a rotor of substantially cylindrical shape provided between the prime mover and the transmission to be rotatable around the axis line, and a stator arranged around the rotor;
a first clutch of multi-plate wet type configured to connect and disconnect a first power transmission path between the output shaft of the prime mover and the electric motor;
a second clutch of multi-plate wet type configured to connect and disconnect a second power transmission path between the electric motor and the input shaft of the transmission;
a case member integrally having a non-rotating sidewall member radially extending to be unrotatable and a non-rotating shaft member of substantially cylindrical shape extending around the axis line supported by an inner radially end portion of the non-rotating sidewall; and
a rotor support member integrally having a rotating shaft member of substantially cylindrical shape rotatably fitted on an outer peripheral surface of the non-rotating shaft member and a rotating sidewall member facing the non-rotating sidewall member and extending radially outward from the rotating shaft member, and cantilevering the rotor through the rotating shaft member and the rotating sidewall member, wherein
the first clutch and the second clutch are arranged side by side in an axial direction of the axis line in a space sideward of the rotating sidewall member and radially inward of the rotor, and each of the first clutch and the second clutch has a plurality of first plates and a plurality of second plates alternately arranged in the axial direction to be rotatable relative to each other, a clutch hub of the first and second clutches supporting radially inner end portions of the plurality of first plates of the first and second clutches movably in the axial direction, and a clutch drum of the first and second clutches supporting radially outer end portions of the plurality of second plates of the first and second clutches movably in the axial direction,
the clutch hub of the first clutch is provided integrally rotatable with the output shaft of the prime mover,
the clutch hub of the second clutch is provided integrally rotatable with the input shaft of the transmission,
the clutch drum of the first clutch and the clutch drum of the second clutch are constituted by a single shared clutch drum, and the single shared clutch drum is integrally rotatable with the rotor support member,
the rotating sidewall member and the rotating shaft member of the rotor support member are a first rotating sidewall member and a first rotating shaft member respectively, the single shared clutch drum has:
- a second rotating shaft member of substantially cylindrical shape around the axis line fitted on an outer peripheral surface of the first rotating shaft member to be integrally rotatable with the first rotating shaft member;
- a second rotating sidewall member facing the first rotating sidewall member and extending radially outward from an axial end of the second rotating shaft member; and
- a guide member of substantially cylindrical shape around the axis line extending from a radially outer end portion of the second rotating sidewall member in the axial direction, and the plurality of second plates of the first clutch and the plurality of second plates of the second clutch are respectively supported on an inner peripheral surface of the guide member movably in the axial direction.

2. The hybrid vehicle drive apparatus according to claim 1, wherein
the rotor support member has a retaining member extending from a radially outer end portion of the rotating sidewall member in the axial direction, and the rotor is fitted on an outer peripheral surface of the retaining member to be retained.

3. The hybrid vehicle drive apparatus according to claim 1, wherein
the rotor support member has a retaining member extending from a radially outer end portion of the rotating sidewall member in the axial direction, and the rotor is fitted on an outer peripheral surface of the retaining member to be retained, and
a gap is provided between an inner peripheral surface of the retaining member and an outer peripheral surface of the guide member, and cooling lubricant flows through the gap.

4. The hybrid vehicle drive apparatus according to claim 1, wherein
the first clutch is fitted on an outer peripheral surface of the clutch hub of the first clutch, and further has a clutch piston pushed by hydraulic power to press the plurality of first plates and the plurality of second plates of the first clutch against each other, and
the second clutch is fitted on an outer peripheral surface of the second rotating shaft member, and further has a clutch piston pushed by hydraulic power to press the plurality of first plates and the plurality of second plates of the second clutch against each other.

5. The hybrid vehicle drive apparatus according to claim 4, wherein
the clutch hub of the first clutch has a shaft member relatively rotatably fitted on an outer peripheral surface of the input shaft of the transmission, and
the first clutch has a stop plate fitted on an outer peripheral surface of the shaft member of the first clutch and arranged between the clutch piston of the first clutch and the clutch hub of the second clutch to restrict movement of the clutch piston of the first clutch in the axial direction.

6. The hybrid vehicle drive apparatus according to claim 1, further comprising:
a hydraulic pump; and
an endless belt-like member configured to transmit torque of the rotating shaft member of the rotor support member to a rotating shaft of the hydraulic pump.

7. The hybrid vehicle drive apparatus according to claim 1, further comprising:
a detector arranged laterally to the rotating sidewall member to detect rotation angle of the electric motor.

* * * * *